United States Patent Office 3,646,068
Patented Feb. 29, 1972

3,646,068
6-HALO-4-OXA-STEROIDS
Milan Radoje Uskokovic, Upper Montclair, N.J., assignor to Hoffmann-La Roche Inc., Nutley, N.J.
No Drawing. Continuation-in-part of application Ser. No. 759,794, Sept. 13, 1968, now Patent No. 3,576,849, which is a continuation-in-part of application Ser. No. 680,308, Nov. 3, 1967. This application June 19, 1970, Ser. No. 47,901
Int. Cl. C07d 10/00
U.S. Cl. 260—343.2 S
15 Claims

ABSTRACT OF THE DISCLOSURE 6-halo-4-oxa-3-oxo-androstanes are prepared via halogenation of 3,5-seco-A-nor-3-oic acids followed by reduction and then lactonization. The end-products are useful as antiandrogens. Particularly preferred embodiments, i.e., 6α-bromo-17β-hydroxy-17α-methyl - 4 - oxa-androstan-3-one are useful as topical agents against acne.

RELATED APPLICATIONS

This application is a continuation-in-part of Ser. No. 759,794 filed Sept. 13, 1968, now U.S. Patent 3,576,849, which is a continuation-in-part of Ser. No. 680,308, filed Nov. 3, 1967 and now abandoned.

DETAILED DESCRIPTION OF THE INVENTION

This invention relates to compounds of the formula

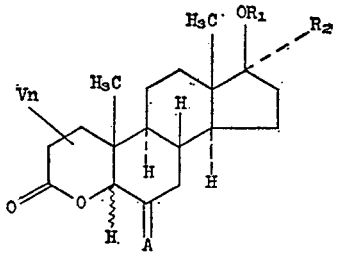

(I)

wherein $R_1$ is hydrogen, lower alkyl or lower alkanoyl, $R_2$ is hydrogen or lower alkyl, V is an unsaturation between the 1- and 2-position and $n$ is a whole integer from 0 to 1, and A is selected from one of the groups

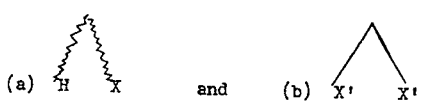

wherein X is halogen, X' is bromine or chlorine and in (b) both halogens are identical, e.g., both are bromine or chlorine.

One preferred embodiment of the present invention is represented by compounds of the formula

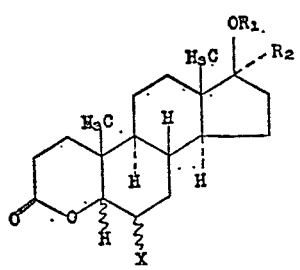

(I')

wherein $R_1$, $R_2$ and X are as above.

Another preferred embodiment of the present invention relates to compounds of the formula

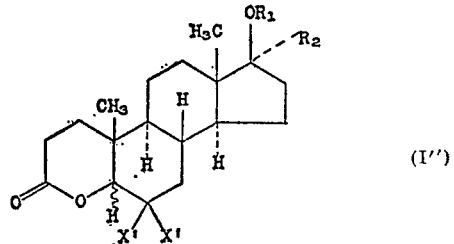

(I'')

wherein $R_1$, $R_2$ and X' are as above with

representing identical halogens.

As used herein the term "lower alkyl" comprehends straight or branched chain saturated hydrocarbon radicals such as methyl, ethyl, isopropyl and the like. Similarly, the term "lower alkanoyl" indicates moieties derived from lower alkane carboxylic acids such as acetic acid, propionic acid and the like. The term "halogen" comprehends bromine, chlorine and fluorine.

The compounds of Formula I can be prepared via treatment of corresponding 3,5-seco-A-nor-androstan-3-oic acids of the formula

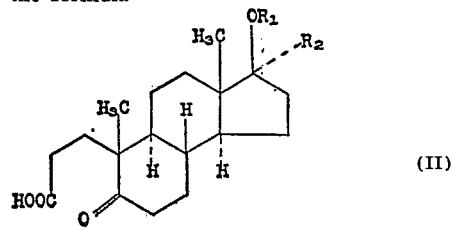

(II)

wherein $R_1$ and $R_2$ have the same meaning as above to insert one or two halogen atoms in the 6-position. The starting materials of Formula II are members of a known class of compounds which can be obtained by ozonolysis of corresponding androst-4-en-3-ones. Monohalogenation via α-keto halogenation can be effected by means known per se (cf., Steroid Reactions, Djerassi, 1963, Holden-Day, Inc., especially chapaters 3 and 4). For example, treatment of a compound of Formula II with bromine or chlorine to produce the corresponding 6-bromo or 6-chloro compound can be effected at room temperature or below, for example, between —30° C. and room temperature. Preferably the reaction is conducted between —12° C. and room temperature. The reaction should be conducted using an amount of bromine or chlorine equimolar to the amount of starting material of Formula II. Moreover, the reaction should be conducted in an inert solvent wherein the starting material of Formula II is soluble. Suitable solvents are, for example, ether/acetic acid, ether/chloroform, dioxane/acetic acid, chloroform, carbon tetrachloride, acetic acid/hydrochloric acid and the like.

Monohalogenation of the compound of Formula II yields a 6-halo-3,5-seco-A-nor-androstan-3-oic acid of the formula

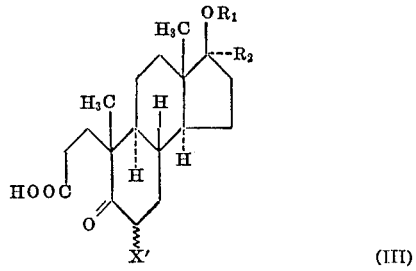

(III)

wherein $R_1$, $R_2$ and X' have the same meaning as above. Compounds of Formula III can be converted to compounds of Formula I' wherein X is bromine or chlorine via means known per se, for example, by treatment with an alkali metal borohydride, such as sodium or lithium borohydride to reduce the 5-oxo moiety to a 5-hydroxy moiety. The treatment with alkali metal borohydride can be effected, for example, below room temperature, at a temperature from the freezing temperature of the solvent to room temperature (suitably in an ice bath), preferably in an inert solvent, suitable solvents being lower alkanols, such as methanol, ethanol or isopropanol, tetrahydrofuran, dioxane, dimethylformamide or the like. Following the reduction, acidification effects cyclization, i.e., lactonization. This lactonization can be effected using organic acids such as acetic acid or mineral acids such as hydrochloric acid. The acid can be directly added to the cooled reaction mixture subsequent to the alkali metal borohydride reduction or the 5-hydroxy compound can be isolated and then acidified to effect lactonization, which can be effected at or below room temperature, i.e., from the freezing point of the solvent system to room temperature.

Compounds of Formula I' where X is fluorine may be prepared from compounds of Formula III where X' is bromine or chlorine by a substitution reaction. The substitution is effected by treatment of the Formula III compound or most desirably with a lower alkyl ester thereof, with a fluorine salt such as, for example, silver, potassium or lithium fluoride. A particularly preferred embodiment utilizes silver fluoride as the fluorine salt. In a preferred embodiment the Formula III compound is initially converted to the corresponding lower alkyl ester by conventional methods prior to substitution. For example, the methyl ester is conveniently prepared from the Formula III acid by reaction with diazomethane in a manner known per se.

The substitution reaction is carried out in the presence of an anhydrous inert organic solvent in which both the reactants are soluble. Suitable solvents include for example, dimethylsulfoxide, acetonitrile, ketones such as acetone and methyl ethyl ketone and dimethyl formamide. While the reaction temperature is not critical, it is most desired that the reaction be run at the reux temperature of the reaction medium. Acceleration of the reaction rate can be obtained by the addition of a small amount of water to the reaction medium such as, for example, about 2 ml. of $H_2O$ per gram of ester compound.

The 6-fluoro seco ester obtained is saponified by treatment with aqueous base in a lower alkanol, e.g., aqueous methanolic NaOH at room temperature. Reduction and lactonization of the resulting 6-fluoro seco acid as above results in the desired 6-fluoro compound of Formula I'.

In another aspect of the above substitution reaction a 6-bromoseco acid of Formula III is converted to the corresponding chloro compound of Formula III by treatment with a chloride salt, e.g., lithium chloride. The solvent medium employed is the same as previously described for the halogen substitution reaction above. This substitution embodiment may be conducted at a temperature of from room temperature to the reflux temperature of the reaction medium, with temperatures at about the former level being preferred.

Halogenation of starting materials of Formula II can also be effected by, for example, treatment of the compound of Formula II with sulfuryl bromide or chloride to yield the corresponding 6,6-dihalo compound (Formula II') which is then dehydrohalogenated to yield the corresponding 6-halo-6-ene compound (Formula II'') which then, upon treatment with alkali metal borohydride as described above, is hydrogenated with concomitant reduction of the carbonyl and then lactonized. The intermediate Formula III compound can optionally be halogen exchanged prior to reduction and lactonization to thus yield the Formula I' compound.

Alternatively, the 6,6-dihalo compound (Formula II') may be directly converted into a compound of Formula I'' by reduction and lactonization in the manner previously described herein. This reaction scheme is illustrated by the following partial formulas:

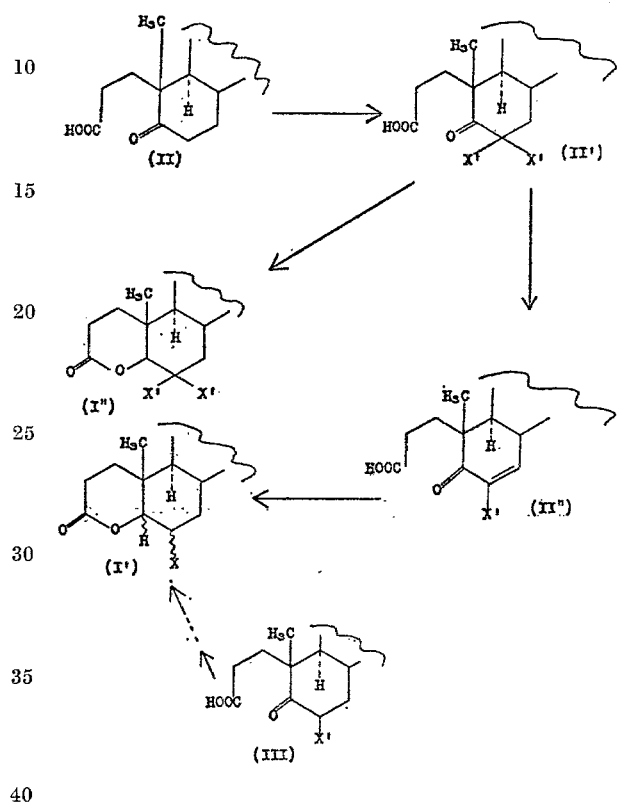

wherein X and X' have the same meaning as above.

The above-described halogenation can be performed according to means known per se, for example, the treatment with sulfuryl bromide or chloride can be conducted preferably at room temperature, or by heating, i.e., between room temperature and about 70° C., in the presence of a solvent system, such as carbon tetrachloride/acetic acid. The dehydrohalogenation can be effected via heating at a temperature between about 80° C. and about 150° C. in the presence of a lithium salt such as the chloride or carbonate and dimethylformamide.

The compounds of Formula I' can also be obtained via treatment of compounds of the formula

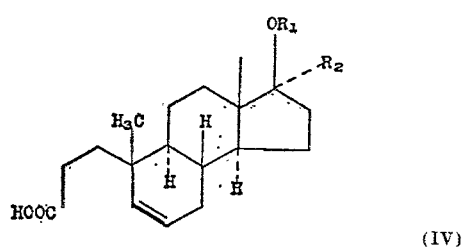

(IV)

wherein $R_1$ and $R_2$ have the same meaning as above with a peracid to yield the corresponding 5α,6α-oxido compound; this peracid treatment can be effected by means known per se, for example, at room temperature with metachloroperbenzoic acid. The so-obtained 5α,6α-oxido compound on treatment with hydrogen bromide, hydrogen chloride or hydrogen fluoride yields the corresponding 6β-halo-5α-hydroxy compound of the formula

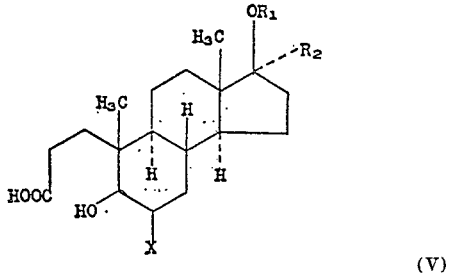

(V)

wherein $R_1$, $R_2$ and X have the same meaning as above. This epoxide opening can be effected by means known per se, for example, in aqueous or non-aqueous medium at room temperature or with heating in solvents such as acetic acid, dioxane, acetone, chloroform, ethanol, or the like. The compound of Formula V simultaneously lactonizes to a compound of Formula I′ since the compound of Formula V is formed under acidic conditions. Dehydration of the compound of Formula V thus yields a compound of Formula I′.

In another route of obtaining compounds of Formula I′, a compound of Formula IV is directly subjected to treatment with halogen, such as bromine or chlorine, in a suitable inert organic solvent, such as carbon tetrachloride, methanol or the like. This treatment can conveniently be effected at room temperature or below room temperature.

The compounds of Formula IV can be prepared by dehydrating the 5-hydroxy compound obtained by reduction of a compound of Formula II. The reduction of the compound of Formula II can be effected under nonacidic conditions by catalytic hydrogenation or by treatment with alkali metal borohydride as described above. The dehydration can be effected for example via conversion to the 5-tosyloxy compound, followed by treatment with collidine or dimethylformamide at elevated temperature up to about 150° C. to effect dehydrotosylation. These reactions are also known per se.

In another embodiment of the present invention compounds of Formula I wherein $n$ is 0 are treated with an oxidizing agent so as to yield compounds of the following formula

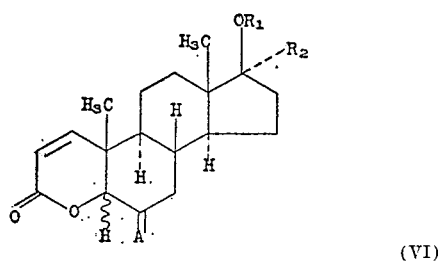

(VI)

wherein $R_1$, $R_2$ and A is as above.

The oxidizing agent utilized to introduce the 1,2-unsaturation is preferably a quinone such as for example 2,3-dichloro-5,6-dicyanobenzoquinone. Solvents useful in this reaction include, for example, dioxane, benzene and tetrahydrofuran. The oxidation reaction is effected with heating, most preferably at the reflux temperature of the reaction medium.

A most preferable embodiment of this aspect of the invention is obtained when A is

is bromine, $R_1$ is hydrogen and $R_2$ is methyl in Formula VI above.

Products of Formula I wherein $R_1$ is hydrogen can be converted to products of Formula I wherein $R_1$ is lower alkanoyl via conventional lower alkanoylation means, for example, by treatment with acetic anhydride in pyridine.

Prior to the alkali metal borohydride treatment it is advantageous to hydrolyze an intermediate wherein $R_1$ is lower alkanoyl to the corresponding compound wherein $R_1$ is hydrogen. This hydrolysis can be effected according to known means, for example, by alkaline hydrolysis such as by treatment with aqueous sodium hydroxide.

Additionally, compounds of Formula I wherein $R_1$ is lower alkanoyl can be obtained from a starting material corresponding to Formula II, but wherein $R_1$ represents an alkyl group, preferably tert-butyl, which is subjected to the treatments described above for the introduction of a 6-halo substituent and for effecting cyclization, the alkyl group thereafter being replaced by lower alkanoyl by conventional means, for example by treatment with a lower alkanoic acid, e.g., acetic acid, in the presence of hydrogen bromide.

End-products of Formulae I, I′, I″ and VI are useful as anti-androgens with some preferred embodiments of Formula I′ being particularly useful as topically active anti-acne agents. In Formulae I, I′ and VI, the substituents at the asymmetric centers at positions 8, 9, 10, 13, 14 and 17 are shown in a specific stereochemical configuration whereas the substituents at the asymmetric centers at positions 5 and 6 are not shown in a specific stereochemical configuration. The invention includes compounds of these formulae having each of the possible stereochemical configurations at positions 5 and 6, i.e., four different diastereoisomers, as well as their enantiomers and the racemates. It should be noted, however, that not all of the four possible diastereoisomers or their enantiomers necessarily possess usefulness as anti-androgens. For example, 6α-bromo-17β-hydroxy-17α-methyl-4-oxa-androstan-3-one which falls within Formula I (i.e., the 5α,6α-enantiomer) is useful as an anti-androgen whereas such usefulness has not been found for the other three diastereoisomers or their enantiomers of this compound. The non-endocrinologically useful diastereoisomers are, however, useful in that they are intra-convertible. Thus, one A/B trans epimer can be converted into the other A/B trans epimer; for example, a 5α,6β-isomer can be converted into the 5α,6α epimeric compound by equilibration in the presence of bromide ions (for example, by treatment with lithium bromide or sodium bromide). Similarly, the A/B-cis epimers can be intra-converted.

Moreover, the 5β compounds can be hydrolyzed under alkaline conditions (for example, using aqueous sodium hydroxide) to yield the corresponding 3,5-seco-A-nor-5-ol-3-oic acids which can be oxidized for example, by chromium trioxide in the presence of acetic acid/methylene chloride, to the corresponding 3,5-seco-A-nor-5-oxo-3-oic acid which then can be reduced and lactonized as described earlier to yield the other A/B-trans diastereoisomers.

As indicated above, the compounds of Formulae I, I′, I″ and VI are useful as anti-androgens. Where applicable the compound can be administered in the form of the racemate or in the form of the enantiomer or enantiomers which possess the antiandrogenic activity. It is preferred to administer the specific enantiomers which possess the anti-androgenic activity. These compounds inhibit the effect of androgens upon androgen-responsive organs. The anti-androgenic activity is shown, for example, by administering to each of five castrate male rats, weighing approximately 40–50 grams, concurrent injections of the compound in sesame oil at 5 mg./0.2 ml./rat/day, and testosterone propionate at 0.1 mg./0.2 ml./rat/day by separate injection. A control group of five rats should receive the testosterone propionate alone. After seven days of treatment all animals are autopsied and weights of their seminal vesicles and prostrates are determined. Inhibition of the effect of testosterone propionate on the target organs shows activity. Besides inhibition of androgenic response to testosterone propionate, anti-androgenic effect can also be shown by measuring response inhibition to other androgens such as testosterone, fluoxymesterone or the like.

The endocrinologically useful compounds of this invention can be administered topically or internally, for example, orally or parenterally. Dosage should be adjusted to individual needs. The active ingredient of Formulae I, I', I'' and VI can be administered in conventional solid and liquid pharmaceutical dosage forms such as capsules, tablets, suppositories, solutions, suspensions, creams or the like. They can contain conventional pharmaceutical additives such as stearyl alcohol, cetyl alcohol, petrolatum, polyalkylene glycols, water, carnauba wax, lactose, corn starch, calcium stearate, talc or the like. They can be submitted to conventional pharmaceutical expedients such as sterilization or the like and can contain preservatives, emulsifying agents, agents for the adjustment of osmotic pressure and the like.

Preferred embodiments of the present invention, i.e., compounds of Formula I', most preferably 6α-bromo-17β-hydroxy-17α-methyl-4-oxa-androstan-3-one are particularly useful as topical anti-acne agents. For such use these compounds may be formulated for topical application in a manner known per se as gels, ointments, salves, lotions, creams and the like. Generally, the topical dosage form will contain from about 0.1 to 10 wt. percent of the compound of Formula I', most preferably from about 0.5 to 5.0 wt. percent. The remainder of the dosage form will consist of conventional topical pharmaceutical carrier materials and can, if desired, contain other phermaceutically active components.

The following examples are illustrative but not limitative of the invention. All temperatures, unless otherwise stated, are in degrees centigrade. Compounds having a proton at an asymmetric carbon atom at position-5 bear such proton in the 5α-stereo configuration unless explicitly denoted as having a 5β-stereo-configuration.

EXAMPLE 1

To a solution of 12.88 g. of 17β-hydroxy-17α-methyl-5-oxo-3,5-seco-A-norandrostan-3-oic acid in 150 ml. of glacial acetic acid and 1500 ml. of anhydrous ether, stirred and cooled in an ice bath, was added 2 ml. of acetic acid saturated with hydrogen bromide. This was followed after five minutes by dropwise addition of 21 ml. of 33% bromine in acetic acid diluted with 200 ml. of ether. The dropwise addition took about one hour and its rate was synchronized with the rate of decoloration of the added bromine in the reaction mixture. To the so-obtained reaction mixture, with continued stirring and cooling, was added in portions 1700 ml. of 2 N aqueous sodium carbonate. Then the reaction mixture was transferred into a separatory funnel, shaken well, and the carbonate layer separated. The ethereal layer was washed three times, each time with 100 ml. of aqueous 2 N sodium carbonate. The carbonate liquors were combined, and after addition of ice, acidified to pH 1 with concentrated hydrochloric acid. After standing one hour, the precipitated acid was collected by filtration, washed well with water, and dried in an oven at 45°. This gave crude 6β-bromo-17β-hydroxy - 17α - methyl-5-oxo-3,5-seco-A-norandrostan-3-oic acid, melting point 192–194°.

A total of 10 g. of sodium borohydride was added portionwise over a period of 20 minutes to a solution of 10.3 g. of the crude 6β-bromo-17β-hydroxy-17α-methyl-5-oxo-3,5-seco-A-nor-androstan-3-oic acid in 350 ml. of methanol, stirred and cooled in an ice-bath. Stirring and cooling were continued for an additional hour to give a mixture containing the epimeric 6β-bromo-5ξ,17β-dihydroxy-17α-methyl-3,5-seco-A-nor-androstan-3-oic acid.

EXAMPLE 2

To a solution of 17 g. of crude 6β-bromo-17β-hydroxy-17α-methyl-5-oxo-3,5-seco - A - norandrostan-3-oic acid (prepared as in Example 1) in 540 ml. of methanol, was added 51 ml. of 1 N sodium hydroxide solution and the reaction mixture was left at 0° overnight. It was then neutralized with 51 ml. of 1 N hydrochloric acid and diluted with three liters of water. The precipitated acid was separated by filtration, washed with water and dried in an oven at 45°. This gave crude 6α-bromo-17β-hydroxy-17α-methyl-5-oxo-3,5-seco-A-norandrostan - 3 - oic acid which upon repeated recrystallizations from methanol melted at 201–202.5°; $[\alpha]_D^{24.0}$ —13.7° (c.=0.59 in tetrahydrofuran) taken on automatic polarimeter, and $[\alpha]_D^{25}$ —18.2° (c.=1 in tetrahydrofuran) taken on a classical polarimeter.

EXAMPLE 3

To a solution of 10.3 g. of crude 6β-bromo-17β-hydroxy - 17α - methyl-5-oxo-3,5-seco-A-norandrostan-3-oic acid (prepared as in Example 1) in 350 ml. of methanol, stirred and cooled in an ice-bath, was added in portions during 20 minutes 10 g. of sodium borohydride. Stirring and cooling was continued for an additional hour. The reaction mixture was then acidified with concentrated hydrochloric acid to pH ca. 1, and after 15 minutes evaporated in vacuo to a small volume. It was diluted with 250 ml. of water and extracted with one liter of ether. The ethereal extract was washed three times, each time with 50 ml. of 2 N aqueous sodium carbonate, then dried with anhydrous magnesium sulfate, and evaporated to dryness. This gave a syrupy residue, which after crystallization and several recrystallizations from ether gave 6β-bromo-17β-hydroxy-17α-methyl-4-oxa-androstan - 3 - one, melting point 163–174° (decomposition). $[\alpha]_D^{23}$ —9.6° (c.=0.39 in methanol).

To a solution of 21 g. of the foregoing crude 6α-bromo-17β-hydroxy - 17α - methyl-5-oxo-3,5-seco-A-nor-androstan-3-oic acid in 700 ml. of methanol, stirred and cooled in an ice-bath, there were added portionwise over a period of 30 minutes 21 g. of sodium borohydride. After the addition was complete, the mixture was stirred and cooled for an additional hour. The mixture so-obtained contained the epimeric 6α-bromo-5ξ,17β-dihydroxy - 17α-methyl-3,5-seco-A-nor-androstan-3-oic acids.

EXAMPLE 4

To a solution of 21 g. of crude 6α-bromo-17β-hydroxy-17α-methyl - 5 - oxo-3,5-seco - A - norandrostan - 3 - oic acid (prepared as in Example 2) in 700 ml. of methanol, stirred and cooled in an ice-bath, was added 21 g. of sodium borohydride in portions during 30 minutes. After addition was complete, the reaction mixture was stirred and cooled for an additional hour, and then acidified to pH 1 with concentrated hydrochloric acid. The resulting suspension was reduced in vacuo to 200 ml. volume, diluted with 600 ml. of water, and extracted three times, each time with 500 ml. of ether. The ethereal extract was washed twice with 50 ml. of 2 N aqueous sodium carbonate and then twice with 100 ml. of water, then dried with anhydrous magnesium sulfate and evaporated to dryness. The residue crystallized on trituration with ether. As shown by thin layer chromatography, this product contains as major components 6α-bromo-17β-hydroxy-17α-methyl-4-oxoandrostan-3-one and 6α-bromo-17β-hydroxy-17α-methyl-4-oxo - 5β - androstan - 3 - one. These compounds were separated from the crude product by fractional crystallization using acetone as solvent.

6α - bromo - 17β - hydroxy - 17α - methyl - 4 - oxa-androstan-3-one is unstable on prolonged heating. This influences its melting point, which was determined on a "kofler hot stage." When put on stage at room temperature and heated slowly, then it melted with decomposition at 202–204°. When put on stage at 170°, then it melts and decomposes at 213–213.5°, after a transformation at 207°. When put on stage at 210°, then it melts and decomposes at 223–223.5°, and when put on stage at 220°, then it melts and decomposes at 226–226.5°, $[\alpha]_D^{25.8}$ +93.2° (c.=0.68 in tetrahydrofuran).

6α - bromo - 17β - hydroxy - 17α - methyl - 4 - oxa-5β-androstan-3-one melts at 192.5–195° (with decomposition). $[\alpha]_D^{25.1}$ —92° (c.=0.525 in tetrahydrofuran).

EXAMPLE 5

A suspension of 7.5 g. of 6α-bromo-17β-hydroxy-17α-methyl-1,4-oxa-5β-androstan-3-one and 30 g. of zinc dust in 700 ml. of absolute ethanol was stirred and refluxed for 48 hours. Thin layer chromatography of the reaction mixture showed at this time that no more starting material was present. The reaction mixture was filtered and the filtrate evaporated. The residue was dissolved in 225 ml. of methanol, and after addition of 45 ml. of 1 N aqueous potassium hydroxide, was left overnight at room temperature. Next morning it was filtered and evaporated. The residue was taken up in 300 ml. of water, made acidic to pH 1 with concentrated hydrochloric acid, and extracted in 1200 ml. of ether. The ethereal solution was extracted four times, each time with 50 ml. of 2 N aqueous sodium carbonate, and then twice with 50 ml. of water. The combined carbonate and water layers were poured in icy concentrated hydrochloric acid, and the precipitated 17β-hydroxy-17α-methyl-3,5-seco - A - norandrost-5-en-3-oic acid was separated by filtration, washed with water and dried in the oven at 40°. After recrystallization from ether, it melted at 179.5–181.5° $[\alpha]_D^{24.5}$ —46.6° (c.=0.9 in tetrahydrofuran).

EXAMPLE 6

To a solution of 1.532 g. of 17β-hydroxy-17α-methyl-3,5 - seco - A - norandrost - 5 - en - 3 oic acid in 100 ml. of methanol, stirred at room temperature, was added dropwise 50 ml. of 0.1 M solution of bromine in carbon tetrachloride, and then the reaction mixture was diluted with 1 liter of ether. The resultant solution was washed twice with 100 ml. of 2 N aqueous sodium carbonate, twice with 100 ml. of water, then dried with anhydrous magnesium sulfate and evaporated. It gave a noncrystalline residue, which was chromatographed on a 1500 g. silica gel column. The fractions eluted with ethyl acetate were combined, and after evaporation gave crystalline 6β-bromo-17β-hydroxy - 17α - methyl-4-oxa-5β-androstan-3-one. After recrystallization from ether, it transformed above 175°, and it melted with transformations between 189–192°. $[\alpha]_D^{24.8}$ —41.5° (c.=0.905 in tetrahydrofuran).

EXAMPLE 7

A mixture of 1 g. of 6α-bromo-17β-hydroxy-17α-methyl-4-oxa-5β-androstan-3-one and 0.1 g. of anhydrous sodium acetate in 10 ml. of acetic anhydride was refluxed for 2 hours and then evaporated to dryness in vacuo. To the residue was added water and the mixture left overnight at room temperature. It was then extracted with 500 ml. of ether, the ethereal extract was washed three times, each time with 25 ml. of 2 N aqueous sodium carbonate, and then twice with 25 ml. of water, then dried over anhydrous magnesium sulfate and evaporated to dryness. The noncrystalline residue was chromatographed on a 300 g. silica gel column, and the fractions eluted with 15% ethyl acetate in benzene were combined and gave crystalline 17β - acetoxy - 6α - bromo - 17α - methyl - 4 - oxa - 5β-androstan-3-one. This material when twice recrystallized from ether melted at 187–188.5° $[\alpha]_D^{24.5}$ —80.7° (c.=1.485 in tetrahydrofuran).

In the same manner 17β-acetoxy-6α-bromo-17α-methyl-4-oxa-androstan-3-one is prepared from 6α-bromo-17β-hydroxy-17α-methyl-4-oxa-androstan-3-one.

EXAMPLE 8

To a solution of 2.27 g. of 17β-acetoxy - 5 - oxo-3,5-seco-A-norandrostan-3-oic acid in a mixture of 135 ml. of carbon tetrachloride and 15 ml. of glacial acetic acid was added 1.6 ml. of sulfurylchloride, and the reaction mixture was then stirred at room temperature for 19 hours. The solvent was removed in vacuo, and the residue was dissolved in ether. The ethereal solution was extracted with 2 N sodium carbonate. The carbonate layer was acidified with concentrated hydrochloric acid, and the resultant suspension extracted with methylene chloride. This extract was washed with water, dried over anhydrous sodium sulfate and evaporated. The so-obtained crude 17β - acetoxy - 6,6 - dichloro - 5 - oxo-3,5-seco-A-norandrostan-3-oic acid was dissolved in 50 ml. of methanol, and after addition of 12.2 ml. of 1 N potassium hydroxide, the reaction mixture was stirred 5 hours at room temperature. It was then diluted with water, washed by shaking with ether, and acidified with concentrated hydrochloric acid. The resulting suspension was extracted with methylene chloride, the extract was washed with water, dried and evaporated. The so-obtained crude 6,6 - dichloro - 17β - hydroxy - 5 - oxo-3,5 - seco-A-norandrostan-3-oic acid was recrystallized from methanol and upon repeated recrystallizations from methanol melted at 190–192.5°; $[\alpha]_D^{25}$ —77.5° (c.=1, in CHCl$_3$).

EXAMPLE 9

To a solution of 1.72 g. of 6,6 - dichloro - 17β - hydroxy - 5 - oxo - 3,5 - seco-A-norandrostan-3-oic acid in 100 ml. of dimethylformamide was added 3.58 g. of lithium carbonate, and the reaction mixture was then stirred and heated at 100° for 22.5 hours. After cooling to room temperature, the reaction mixture was diluted with ether and extracted with 2 N sodium carbonate. The carbonate layer was acidified with concentrated hydrochloric acid, and extracted with methylene chloride. This extract was washed with water, dried over anhydrous sodium sulfate and evaporated. The residue was chromatographed on preparative thin layer plates. The product so-obtained, after two recrystallizations from acetone-hexane, gave 6 - chloro - 17β - hydroxy - 5 - oxo-3,5-seco-A-norandrost-6-en-3-oic acid, melting point 189.5–192.5° $[\alpha]_D^{25}$ —51.4° (c.=1, in CHCl$_3$).

EXAMPLE 10

To a solution of 1 g. of 6-chloro - 17β - hydroxy-5-oxo - 3,5 - seco-A-norandrost - 6 - en-3-oic acid, stirred and cooled in an ice-bath, was added in portions 1 g. of sodium borohydride during 30 minutes. The reaction mixture was then stirred and cooled for an additional hour, (this mixture contained the diastereoisomeric-6-chloro - 5ξ,17β - dihydroxy - 3,5 - seco-A-nor-androstan-3-oic acids) acidified with 5 ml. of concentrated hydrochloric acid and left for two hours at room temperature. After dilution with 1 liter of methylene chloride, it was washed twice with 50 ml. of 2 N sodium carbonate, then with water, dried and evaporated. The residue was dissolved in a mixture of 5 ml. pyridine and 5 ml. acetic anhydride, and left at room temperature for 72 hours. It was then evaporated in vacuo. The residue was washed with water and after drying it was crystallized from ether giving crystals which after repeated recrystallizations from acetone gave 17β-acetoxy - 6α - chloro-4-oxa-5β-androstan-3-one, melting point 293–300° (with decomposition). $[\alpha]_D^{24.8}$ —53.8° (c.=0.55 in tetrahydrofuran).

The mother liquors were purified by chromatography on a silica gel column, and after recrystallization from acetone-ether (1:10) gave 17β - acetoxy - 6β - chloro-4-oxa-androstan-3-one, melting point 178–181°. $[\alpha]_D^{24.8}$ +11.9° (c.=1.05 in tetrahydrofuran).

EXAMPLE 11

A mixture of 1.002 g. (0.004 mole) of 6β-bromo-17β-hydroxy - 17α - methyl - 5 - oxo - 3,5 - seco-A-norandrostan-3-oic acid and 1.065 g. of lithium chloride in 35 ml. of dimethylsulfoxide was stirred at room temperature for 3 days. The reaction mixture was then diluted with 1.5 l. of ether, washed with water (4× 100 ml.), dried over anhydrous magnesium sulfate and evaporated. The residue, consisting of crystalline material was recrystallized from acetone to give 6α-chloro-17β-hydroxy-17α-methyl-5-oxo-3,5-seco-A-norandrostan-3-oic acid, M.P. 231–233.5° (with decomposition); $[\alpha]_D^{24.8}$ −18.1° (c.=1.03 in tetrahydrofuran).

EXAMPLE 12

17β-hydroxy - 17α - methyl - 5 - oxo - 3,5 - seco-A-norandrostan-3-oic acid (30 g.) was dissolved with heating in 300 ml. of glacial acetic acid, the stirred solution was cooled to room temperature, 3 ml. of acetic acid saturated with hydrogen chloride (gas) was added followed immediately by 98.9 ml. (1.06 equiv. of 1.00 molar) of chlorine in acetic acid (over 5 min.). After another 5 minutes the colorless solution was diluted with 1300 ml. of $H_2O$ and cooled in an ice-bath for 30 minutes. The solid was collected, washed with $H_2O$, and dried in vacuo at 90°.

The above substance (29.4 g.) in 490 ml. of methanol was cooled to ca. +3°, 95 ml. of cold, 1 N sodium hydroxide solution was added and the mixture was allowed to remain at +3° for 3.5 hours. Cold 1 N hydrochloric acid (100 ml.) and $H_2O$ (980 ml.) were added, the mixture was cooled in an ice-bath for 0.5 hr., filtered and washed with cold methanol/$H_2O$ (1:1) and cold acetone. The product 6α-chloro - 17β - hydroxy-17α-methyl - 5 - oxo - 3,5 - seco-A-norandrostan - 3 - oic acid after drying at 90° had a melting point of 218–221° (dec.) $[\alpha]_D^{25}$ −20.5° (in tetrahydrofuran, c.=1.0).

EXAMPLE 13

A 1 l., three-neck, round bottom flask, equipped with an air stirrer, 250 ml. dropping funnel, and calcium chloride drying tube was flame-dried, charged with 1.0 g. of lithium borohydride in 100 ml. of tetrahydrofuran (previously filtered over Woelm neutral alumina, activity I; 10 ml. of tetrahydrofuran/1.0 g. of alumina), and cooled in a Dry Ice-acetone bath (−75°). To this was added, over 0.5 hr., a solution of 10 g. of the 6α-chloro-seco acid prepared in Example 12 in 200 ml. of tetrahydrofuran (filtered over alumina, as above). The reaction was allowed to continue for 4 hours with cooling (−75°) and stirring. Excess hydride was then decomposed by the slow addition of 20 ml. of $H_2O$ to the cold solution. The solution thus obtained contained the epimeric 6α-chloro-5ξ,17β-dihydroxy-17α-methyl-3,5-seco-A-nor-androstan-3-oic acids. The solution was adjusted to ca. pH 1 by the addition of 5 ml. of concentrated hydrochloric acid. After warming the mixture to room temperature the tetrahydrofuran was removed in vacuo (35°), and the residue was dissolved in 120 ml. of methylene chloride, 200 ml. of $H_2O$ was added, and the aqueous phase was extracted with two 120 ml. portions of methylene chloride. The organic phase was washed with 200 ml. of 10% sodium carbonate, two 200 ml. portions of $H_2O$, 200 ml. of saturated sodium chloride solution, and dried (anhydrous sodium sulfate). The white solid obtained after removal of the solvent in vacuo (60° bath) had an isomer distribution as determined by NMR analysis of 5α,6α:5β,6α 4:5. The isomers were separated by fractional crystallization from acetone. 6α-chloro-17β-hydroxy-17α-methyl-4-oxa-androstan-3-one on recrystallization from methylene chloride/ether and drying at 100° in vacuo had a melting point of 199–201° (turbid, clear at 203°)—variable melting point: $[\alpha]_D^{25}$ +102.4° (c.=0.5 in tetrahydrofuran). 6α-chloro-17β-hydroxy-17α-methyl-4-oxa-5β-androstan-3-one was recrystallized as above and dried at 105° in vacuo to yield needles melting at 204–208° (sintering)—variable melting point: $[\alpha]_D^{25}$ −91.0° (c.=0.5 in tetrahydrofuran).

EXAMPLE 14

A suspension of 50 g. of 6α-bromo-17β-hydroxy-17α-methyl-5-oxo-3,5-seco-A-norandrostan-3-oic acid in 1 l. of ether was stirred and chilled in an ice-bath. This was treated with a solution of diazomethane (from 100 g. of N-nitrosomethylurea in a total of three 1 l. portions of ether) for 4 hr. at ice-bath temperature and then overnight at room temperature. The ether solution was washed (1 l. of cold 5% sodium bicarbonate, 1 l. of $H_2O$), dried (sodium sulfate), and evaporated to give crude product. The product was dissolved in 100 ml. of hot methylene chloride, the solvent was displaced with a total of 250 ml. of ether, and crystallization occurred from the hot solution; the final volume was ca. 125 ml. The product, 6α-bromo-17β-hydroxy - 17α - methyl-5-oxo-3,5-seco-A-norandrostan-3-oic acid methyl ester was collected after chilling overnight (−20°) and dried at 70° for 1 hr. The mother liquors, concentrated to 30 ml., afforded another crop of the methyl ester. A sample was recrystallized from methylene chloride-ether and had a melting point of 124–128°; $[\alpha]_D^{25}$ −16.5° (in $CHCl_3$, c.=1.0).

EXAMPLE 15

A 2 l. three-neck, round bottom flask, equipped with an air-stirrer, reflux condenser and a Soxhlet extractor (43 x 125 mm. thimble), was charged with 30.0 g. of the bromomethyl ester prepared in Example 14 in 675 ml. of acetonitrile and 60 ml. of $H_2O$. AgF (150 g., Harshaw Argentous AgF) was placed in the thimble and the mixture was refluxed and stirred for 23 hr. The reaction was followed by TLC analysis. A brown precipitate was removed by filtration, most of the solvent was removed from the filtrate in vacuo (55–60°), the residue was extracted with 750 ml. of ether (the aqueous phase was set aside) and the organic phase was washed with three 800 ml. portions of $H_2O$ and dried over sodium sulfate. The original aqueous phase was extracted with 500 ml. of methylene chloride which was washed with 200 ml. of $H_2O$, dried over sodium sulfate and combined with the ether extract. Concentration of the solvent yielded a yellow oil. The oil containing a mixture of isomers was dissolved in methylene chloride and filtered over a column of silica gel (120 g., Merck AG, 0.05–0.2 mm.):

| Fraction: | Solvent |
| --- | --- |
| 1 | 2 l. $CH_2Cl_2$. |
| 2 | 2 l. $CH_2Cl_2$. |
| 2 | 2 l. $CH_2Cl_2$. |
| 4 | 2 l. 5% acetone—$CH_2Cl_2$. |
| 5 | Do. |

The combined crude mixed isomers of 6α- and 6β-fluoro-17β-hydroxy-17α-methyl-5-oxo - 3,5-seco-A-norandrostan-3-oic methyl ester obtained from fractions 1–5 was used as is for subsequent transformations.

The total crude mixed isomers above was dissolved in 220 ml. of methanol, 123 ml. (2 equiv.) of 1 N sodium hydroxide was added, and the saponification/equilibration reaction was allowed to continue at room temperature for 2 hours while the reaction was followed by TLC analysis. The solution was first extracted with 150 ml. of methylene chloride and this organic phase was discarded. Then the aqueous phase was acidified with 1 N hydrochloric acid and extracted with three 250 ml. portions of methylene chloride/ether (2:1). The organic extract after being washed with 500 ml. of $H_2O$, two 250 ml. portions of saturated sodium chloride solution, and dried over sodium sulfate, afforded 6α-fluoro-17β-hydroxy-17α-methyl-5-oxo-3,5-seco-A-norandrostan-3-oic acid. This was crystallized by solution in 300 ml. of hot acetone, boiling down to ca. 125 ml., diluting with 25 ml. of warm petroleum ether (30–60°) and chilling overnight at +3°. The product began to crystallize from the hot solution. A sample of product was recrystallized from acetone, dried in vacuo (100°) and was found to have a melting point of 212–215°; $[\alpha]_D^{25}$ −9.6 (in tetrahydrofuran, c.=0.50).

EXAMPLE 16

6α - fluoro - 17β - hydroxy - 17α - methyl - 5 - oxo-3,5-seco-A-norandrostan-3-oic acid, 11.0 g., in tetrahydrofuran (220 ml.) was treated with lithium borohydride (1.1 g.) in 110 ml. of tetrahydrofuran to yield the epimeric 6α-fluoro-5,17β-dihydroxy-17α-methyl-5-oxo - 3,5-seco-A-norandrostan-3-oic acids which were lactonized exactly as described for the reduction of the chloro-seco acid in Example 13. The product was isolated by extraction with methylene chloride as already described; the organic extract was washed with 100 ml. of cold, 5% sodium bicarbonate solution, and crude mixed isomer fluoro-lactones was obtained, $[\alpha]_D^{25}$ —12.0° (in tetrahydrofuran, c.=0.50).

Fractional crystallization from acetone afforded the pure isomers. In general, the material was allowed to cool at room temperature for 2 hr., the supernatant and washings were combined, and the product was dried in vacuo (90°). On recrystallization of the crude 6α-fluoro-17β-hydroxy-17α-methyl-4-oxa-androstan-3-one having an $[\alpha]_D^{25}$ of about +90° from methylene chloride-ether and drying there were obtained crystals of M.P. 223–228°; $[\alpha]_D^{25}$ +94.0° (c.=0.25 in tetrahydrofuran). Recrystallization of crude 6α-fluoro-17β-hydroxy-17α-methyl-4-oxa-5β-androstan-3-one of $[\alpha]_D^{25}$ of about —42° from acetone and drying yielded needles of M.P. 240–248° (sintering from 235°); $[\alpha]_D^{25}$ —43.8° (c.=0.5 in tetrahydrofuran.)

EXAMPLE 17

A solution of 1.925 g. (0.005 mole) of 6α-bromo-17β-hydroxy-17α-methyl-4-oxa-androstan-3-one and 1.36 g. of 2,3-dichloro-5,6-dicyano-benzoquinone in 75 ml. of anhydrous dioxane was stirred and refluxed for five days. After addition of 0.68 g. of 2,3-dichloro-5,6-dicyano-benzoquinone, the stirring and refluxing was continued for another 5 days. After cooling and filtration, the filtrate was evaporated to dryness. The residue was dissolved in 500 ml. of ethyl acetate and filtered through a 100 g. alumina column and evaporated. The product, was chromatographed on a 1.5 kg. of silica gel column. Elution with benzene containing 30% ethyl acetate gave the crystalline 6α-bromo-17β-hydroxy-17α - methyl-4-oxa-androst-1-en-3-one, M.P. 221.5–222° (from ether); $[\alpha]_D^{25.1°}$ +36.6° (c.=0.55 in tetrahydrofuran).

EXAMPLE 18

To a stirred solution of 0.1 g. (0.0046 mole) of lithium borohydride in 10 ml. of anhydrous tetrahydrofuran at —70° C., was added dropwise a solution of 1 g. (0.00265 mole) of 6,6-dichloro-17β-hydroxy - 5 - oxo-3,5-seco-A-norandrostan-3-oic acid in 30 ml. of anhydrous tetrahydrofuran. The stirring at —70° C. was continued for 4 hours to yield a reaction mixture containing the epimeric 6,6 - dichloro-5ξ,17β-dihydroxy-3,5-seco-A-nor-androstan-3-oic acids. After addition of 2 ml. of water and 2 ml. of concentrated hydrochloric acid, the reaction mixture was stirred at room temperature for 1 hour. It was diluted then with 1 l. of ether, washed with water (25 ml.), 2 N aqueous sodium carbonate, and water (3 × 25 ml.) again, then dried over anhydrous magnesium sulfate and evaporated. This gave crystalline 6,6-dichloro-17β-hydroxy-4-oxa-androstan-3-one; M.P., 238–239° (trans >235°) after recrystallization from acetone/ether; $[\alpha]_D^{24.1°}$ +53.2° (c.= 0.87 in tetrahydrofuran).

EXAMPLE 19

A 0.1% cream of 6α-bromo-17β-hydroxy-17α-methyl-4-oxa-androstan-3-one of the following formulation is prepared as described:

| | Mg. per gram |
|---|---|
| 6α - bromo-17β-hydroxy-17α-methyl-4-oxa-androstan-3-one | 1.00 |
| Stearyl alcohol | 100.00 |
| Cetyl alcohol | 15.00 |
| White petrolatum | 70.00 |
| Methyl parahydroxybenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Ethylenediaminetetraacetic acid tetrasodium salt (EDTA) | 0.10 |
| Distilled water | 597.16 |

The stearyl alcohol, cetyl alcohol, petrolatum, propyl parahydroxybenzoate, isopropyl palmitate and polyoxyl 40 stearate are melted at 75°. The mixture is cooled to and maintained at 70°. EDTA and methyl parahydroxybenzoate are dissolved in hot distilled water to which is added the propylene glycol. The solution is mixed at 75° and slowly added to the oil solution prepared previously, using slow agitation. The resultant emulsion is gradually cooled with slow stirring. When the temperature of the ointment reaches 55°, a solution of 6α-bromo-17β-hydroxy-17α-methyl-4-oxa-androstan-3-one is added and mixed with the ointment. When the temperature of the ointment reaches 50°, cold water is circulated in the jacket of the kettle and the ointment is cooled to 30° with stirring. The ointment is then transferred to storage containers.

EXAMPLE 20

A suppository formulation of 6α-bromo-17β-hydroxy-17α-methyl-4-oxa-androstan-3-one is prepared as described:

| | Per 1.3 gm. suppository, gm. |
|---|---|
| 6α - bromo - 17β - hydroxy - 17α - methyl - 4 - oxa-androstan-3-one | 0.005 |
| Refined synthetic cocoa butter (pharmaceutical grade) | 1.250 |
| Carnauba wax | 0.045 |

The cocoa butter and the carnauba wax are melted in a suitable size glass lined container (stainless steel may also be used), mixed well and cooled to 45°. 6α-bromo-17β-hydroxy-17α-methyl-4-oxa-androstan-3-one, which has been reduced to a fine powder with no lumps, is added and stirred until completely and uniformly dispersed. The mixture is poured into suppository molds to yield suppositories having an individual weight of 1.3 gms. The suppositories are cooled and removed from molds. They are individually wrapped in wax paper for packaging. (Foil may also be used.)

EXAMPLE 21

A tablet formulation of 6α-bromo-17β-hydroxy-17α-methyl-4-oxa-androstan-3-one is prepared as described:

| | Mg. per tablet |
|---|---|
| 6α-bromo-17β-hydroxy-17α-methyl-4-oxa-androstan-3-one | 2.0 |
| Lactose | 121.5 |
| Corn starch | 70.5 |
| Pregelatinized corn starch | 8.0 |
| Calcium stearate | 3.0 |
| Total weight | 205.0 |

6α - bromo - 17β - hydroxy - 17α - methyl - 4 - oxa-androstan-3-one is mixed with the lactose, corn starch and pregelatinized corn starch in a suitable size mixer. The mix is passed through a comminuting machine fitted with No. 1A screen and with knives forward. The mix is returned to the mixer and moistened with water to a thick paste. The moist mass is passed through a No. 12 screen and the moist granules are dried on paper lined trays at 110° F. The dried granules are returned to the mixer, the calcium stearate is added and mixed well. The granules are compressed at a tablet weight of 205 mg., using standard concave punches having a diameter of 5/16″.

EXAMPLE 22

A capsule formulation of 6α-bromo-17β-hydroxy17α-methyl-4-oxa-androstan-3-one is prepared as described:

| | Mg. per capsule |
|---|---|
| 6α-bromo-17β-hydroxy-17α-methyl-4-oxa-androstan-3-one | 5 |
| Lactose | 178 |
| Corn starch | 37 |
| Talc | 5 |
| Total weight | 225 |

6α - bromo - 17β - hydroxy - 17α - methyl - 4 - oxa-androstan-3-one is mixed with the lactose and corn starch in a suitable mixer. The mixture is further blended by passing through a comminuting machine with a No. 1A screen with knives forward. The blended powder is returned to the mixer, the talc added and blended thoroughly. The mixture is then filled into No. 4 hard shell gelatin capsules on a capsulating machine.

EXAMPLE 23

6α - bromo 17β - hydroxy - 17α - methyl - 4 - oxa-androstan-3-one was administered to groups of 5 castrate male rats, each rat weighting approximately 40–50 grams, and each rat receiving the dosage of exogenous androgen indicated below. Control groups of 5 rats received the indicated androgen alone, at the indicated dosage. After seven days of treatment, all animals were autopsied and weights of their seminal vesicles and prostates were determined. The inhibition of the androgenic response of these androgen-responsive organs shows anti-androgenic activity.

Anti-Androgenic Activity of 6α-Bromo-17β-Hydroxy-17α-Methyl-4-Oxa-Androstan-3-one in Castrated Rats

| 6α-bromo-17β-hydroxy-17α-methyl-4-oxa-androstan-3-one | Testosterone propionate | Percent inhibition of androgenic response | |
|---|---|---|---|
| | | Seminal vesicles | Ventral prostate |
| Dose, mcg./day, s.c.: | | | |
| 1,000 | 20 | 56 | 49 |
| 2,000 | 20 | 66 | 54 |
| 4,000 | 20 | 82 | 66 |
| 8,000 | 20 | 86 | 75 |
| | Testosterone, mcg., s.c. | | |
| Dose, mg./day, p.o.: | | | |
| 3.34 | 25 | 100 | 59 |
| | Fluoxymesterone, mcg., p.o. | | |
| 10 | 200 | 31 | 47 |

EXAMPLE 24

To a solution of 18.2 g. of 17β-tert-butoxy-5-oxo-3,5-seco-A-norandrostan-3-oic acid in 500 ml. of anhydrous ether, stirred and cooled in an ice-bath, was added 2 ml. of acetic acid saturated with hydrogen bromide. This was followed after two minutes by dropwise addition of 9 g. bromine diluted with 10 ml. of acetic acid. The addition took about twenty minutes and its rate was synchronized with the rate of decoloration of the added bromine in the reaction mixture. The so-obtained solution was stirred and cooled for an additional fifteen minutes, then transferred into a separatory funnel and washed four times, each time with 700 ml. of water. The ethereal layer was dried with anhydrous sodium sulfate and evaporated to dryness. This gave a syrupy residue which crystallized on trituration with hexane. The product so obtained, after two recrystallizations from isopropyl ether, gave 6β-bromo-17β-tert-butoxy-5-oxo-3,5-seco-A-norandrostan - 3 - oic acid, melting point 139–142° (decomposition), $[\alpha]_D^{25}$ —74° (c.=0.1 in dioxane).

To a solution of 23.5 g. of the crude 6β-bromo-17β-tert-butoxy - 5 - oxo-3,5-seco-A-norandrostan-3-oic acid in 100 ml. of methanol, were added 60 ml. of 1 N sodium hydroxide solution and 400 ml. of water. To the reaction mixture, stirred and cooled in an ice-bath, was added portionwise over 10 minutes 5 g. of sodium borohydride. Stirring and cooling was continued for an additional hour to give a reaction mixture containing the epimeric 6β-bromo-17β - tert-butoxy-5ξ-hydroxy-3,5-seco - A - nor-androstan-3-oic acids. The reaction mixture was then acidified with concentrated hydrochloric acid to pH ca. 1 and after 10 minutes methanol was removed by evaporation in vacuo. The water insoluble material was extracted with ether. The ethereal extract was washed three times, each time with 100 ml. of water, then dried with anhydrous sodium sulfate and evaporated to dryness. The residue, on trituration with ether and cooling, yielded some crystalline material which gave after two recrystallizations from methylene chloride-acetone 6β-bromo-17β-tert-butoxy-4-oxa-androstan-3-one, melting point 193–193.5°, $[\alpha]_D^{25}$ +20° (c.=0.1 in dioxane).

The noncrystalline residue was chromatographed on a 1200 g. florisil column. The fraction eluted first with a total of 1 liter benzene and 5 liter 1 percent acetone in benzene gave after evaporation crystalline 6α-bromo-17β-tert-butoxy - 4 - oxo-5β-androstan-3-one. This material when twice recrystallized from methylene chloride-isopropylether melted at 192.5–193° (decomposition), $[\alpha]_D^{25}$ —54° (c.=0.1 in dioxane). The second fraction, eluted with a total of 4 l. 1 percent acetone in benzene and 3 l. 5 percent acetone in benzene, yielded after evaporation crystalline 6α-bromo-17β-tert-butoxy - 4 - oxa-androstan-3-one $[\alpha]_D^{25}$ +124° (c.=0.1 in dioxane). After two recrystallizations from methylene chloride-isopropylether this product melted at 185–186° with rapid decomposition and transformation to a solid material, which melted and decomposed at 232–235°. A third fraction, eluted with a total of 3 l. methylene chloride gave after evaporation crystalline 6β-bromo-17β-tert-butoxy - 4 - oxa-androstan-3-one with the above mentioned properties.

To a solution of 2.2 g. of the 6α-bromo-17β-tert-butoxy-4-oxa-5β-androstan-3-one in 40 ml. of acetic acid was added 10 ml. of 33 percent hydrobromic acid in acetic acid. The solution was left at room temperature for three hours, diluted with 700 ml. of ice water and the water insoluble material extracted with methylene chloride. The extract was washed with water, dried over anhydrous sodium sulfate and evaporated. After two recrystallizations from methylene chloride-ethyl acetate, the crystalline residue gave 17β-acetoxy-6α-bromo-4-oxa-5β-androstan-3-one, melting point 289–290° (decomposition), $[\alpha]_D^{25}$ —70° (c.=0.1 in dioxane).

To a solution of 3.3 g. of the 6α-bromo-17β-tert-butoxy-4-oxa-androstan-3-one in 60 ml. of acetic acid was added 15 ml. of 33 percent hydrobromic acid in acetic acid. The solution was left at room temperature for three hours, diluted with 1000 ml. of ice-water and extracted with methylene chloride. The extract was washed with water, dried over anhydrous sodium sulfate and evaporated. After recrystallization from acetone, the crystalline residue gave 17β-acetoxy-6α-bromo-4-oxa-androstan-3-one, melting point 270–271° (decomposition), $[\alpha]_D^{25}$ +109° (c.=0.1 in dioxane).

To a solution of 2.2 g. of the 6β-bromo-17β-tert-butoxy-4-oxa-androstan-3-one in 40 ml. of acetic acid, was added 10 ml. of 33 percent hydrobromic acid in acetic acid. The solution was left at room temperature for three hours, diluted with 700 ml. of ice-water and extracted with methylene chloride. The extract was washed with water, dried over anhydrous sodium sulfate and evaporated. After two recrystallizations from ethyl acetate, the crystalline residue gave 17β-acetoxy-6β-bromo-4-oxa-androstan-3-one, melting point 192–193° (decomposition), $[\alpha]_D^{25}$ —5° (c.=0.1 in dioxane).

EXAMPLE 25

A 5.0% gel of 6α-bromo-17β-hydroxy-17α-methyl-4-oxa-androstan-3-one of the following formulation is prepared as described:

| | |
|---|---|
| 6α - bromo - 17β - hydroxy - 17α-methyl - 4 - oxa - androstan-3-one | 5.05 gm. |
| Methyl parabens | 0.08 gm. |
| Propyl parabens | 0.02 gm. |
| Carbopol 934 | 1.25 gm. |
| Aerosol OT | 0.25 gm. |
| Sodium hydroxide (25% w./v.) | Ca. 7.25 ml. to pH 5.0. |
| Distilled water | Q.s. add 100 ml. |

The Aerosol OT was dissolved in ca. 12.5 ml. of distilled water. To this solution there was added the 6α-bromo-17β-hydroxy-17α-methyl - 4 - oxa-androstan - 3 - one powder which was dispersed by stirring. To a separate 50 ml. portion of distilled water there were added the methyl parabens and the propyl parabens and the mixture heated until a solution was obtained. After cooling the Carbopol 934 was added to this solution with high shear stirring until a homogenous slurry was obtained. The dispersion was then added to the slurry with additional stirring. The mixture was adjusted to pH 5.0 with the sodium hydroxide and the volume adjusted to 100 ml. with additional distilled water yielding the desired gel composition.

I claim:
1. A compound of the formula

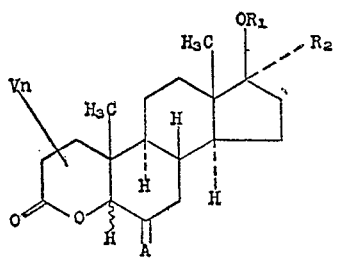

wherein $R_1$ is hydrogen, lower alkyl or lower alkanoyl, $R_2$ is hydrogen or lower alkyl, V is an unsaturation between the 1- and 2-position and $n$ is a whole integer from 0 to 1, and A is selected from one of the groups

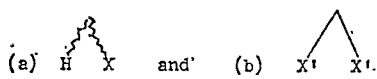

wherein X is halogen, X' is bromine or chlorine and in (b) both halogens are identical.

2. The compound of claim 1 wherein A is group (a) and $n$ is 0, i.e., a compound of the formula

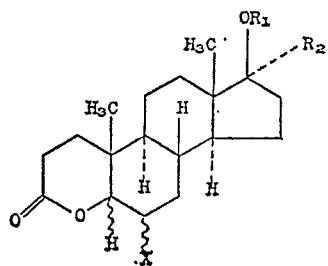

wherein $R_1$, $R_2$ and X are as in claim 1.

3. The compound as in claim 2 wherein $R_1$ is hydrogen and $R_2$ is lower alkyl.
4. The compound as in claim 3 which is a 5α,6α-en-antiomer.
5. The compound as in claim 4 which is 6α-bromo-17β-hydroxy-17α-methyl-4-oxa-androstan-3-one.
6. The compound as in claim 4 which is 6α-fluoro-17β-hydroxy-17α-methyl-4-oxa-androstan-3-one.
7. The compound as in claim 4 which is 6α-chloro-17β-hydroxy-17α-methyl-4-oxo-androstan-3-one.
8. The compound as in claim 2 wherein $R_1$ is methyl carbonyl and $R_2$ is lower alkyl.
9. The compound as in claim 2 wherein $R_1$ is methyl carbonyl and $R_2$ is hydrogen.
10. The compounds as in claim 2 wherein $R_1$ is tertiary butyl and $R_2$ is hydrogen.
11. The compound of claim 1 wherein $n$ is 1, i.e., a compound of the formula

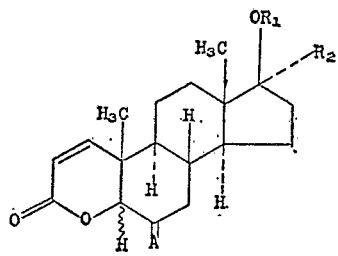

wherein $R_1$, $R_2$ and A are as in claim 1.

12. The compound of claim 11 wherein A is group (a).
13. The compound of claim 12 wherein X is bromine in the α configuration, $R_1$ is hydrogen and $R_2$ is methyl, i.e., 6α - bromo-17β-hydroxy-17α-methyl-4-oxa-androst-1-en-3-one.
14. The compound of claim 1 wherein $n$ is 0 and A is group (b), i.e., a compound of the formula

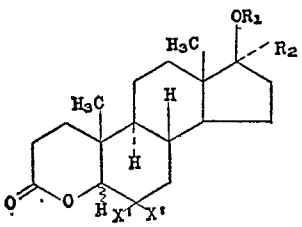

wherein $R_1$, $R_2$ and X' are as in claim 1.

15. The compound of claim 14 where $R_1$ and $R_2$ are hydrogen and X' is chlorine, i.e., 6,6-dichloro-17β-hydroxy-4-oxa-androstan-3-one.

References Cited
UNITED STATES PATENTS
3,251,860   5/1966   Pappo et al. _____ 260—343.2
3,591,607   7/1971   Furst et al. _____ 260—343.2

JOHN M. FORD, Primary Examiner

U.S. Cl. X.R.
260—343.2 S, 514 R; 424—279